United States Patent
Johnson et al.

[11] Patent Number: 5,965,954
[45] Date of Patent: Oct. 12, 1999

[54] ANTI-THEFT SYSTEM FOR DISABLING A VEHICLE ENGINE

[75] Inventors: Richard T. Johnson, Hubertus; William J. Wruck, Whitefish Bay; Majid Taghikhani, Franklin, all of Wis.

[73] Assignee: Johnson Controls Technology Company, Plymouth, Mich.

[21] Appl. No.: 08/936,293

[22] Filed: Sep. 25, 1997

[51] Int. Cl.⁶ .................................................. B60R 25/00
[52] U.S. Cl. .......................................... 307/10.3; 180/287
[58] Field of Search ...................... 307/9.1–10.8, 307/100; 340/425.5, 426, 435, 825.31, 825.34, 825.36, 825.44, 825.54, 825.69, 825.72; 361/171, 172, 212, 217; 123/179.1, 179.2, 179.3, 179.4, 198 DC; 701/1, 2, 36; 180/287

[56] References Cited

U.S. PATENT DOCUMENTS

| | | |
|---|---|---|
| 3,194,970 | 7/1965 | Claps . |
| 3,430,058 | 2/1969 | Yoshida . |
| 3,464,060 | 8/1969 | Arditti . |
| 3,634,724 | 1/1972 | Vest . |
| 3,922,996 | 12/1975 | Meyer ................................ 123/198 DC |
| 4,004,273 | 1/1977 | Kalogerson . |
| 4,023,138 | 5/1977 | Ballin . |
| 4,063,610 | 12/1977 | Shilling .................................. 307/10.2 |
| 4,159,467 | 6/1979 | Ballin . |
| 4,207,850 | 6/1980 | Wharton . |
| 4,218,717 | 8/1980 | Shuster . |
| 4,222,033 | 9/1980 | Brown . |
| 4,302,747 | 11/1981 | Belmuth . |
| 4,305,004 | 12/1981 | Tanaka et al. ........................... 307/100 |
| 4,317,108 | 2/1982 | Schwartz et al. . |
| 4,452,197 | 6/1984 | Weber . |
| 4,485,887 | 12/1984 | Morano . |
| 4,507,644 | 3/1985 | Abrahamson ............................ 180/287 |
| 4,549,090 | 10/1985 | Read ...................................... 180/287 |
| 4,553,127 | 11/1985 | Issa . |
| 4,664,080 | 5/1987 | Minks ................................ 123/198 DC |
| 4,721,872 | 1/1988 | Simmons ................................ 307/10.1 |
| 4,754,159 | 6/1988 | Pointout et al. ........................ 307/10.1 |
| 4,792,792 | 12/1988 | Costino .................................... 180/287 |
| 4,821,017 | 4/1989 | Tanami et al. .......................... 307/10.2 |
| 4,832,146 | 5/1989 | Luby . |

(List continued on next page.)

FOREIGN PATENT DOCUMENTS

| | | | |
|---|---|---|---|
| WO 86/07319 | 12/1986 | WIPO ............................ B60R 25/04 |
| WO 93/15935 | 8/1993 | WIPO ............................ B60R 25/04 |
| WO 95/35228 | 12/1995 | WIPO ............................ B60R 25/04 |
| WO 96/11817 | 4/1996 | WIPO . |

*Primary Examiner*—Richard T. Elms
*Attorney, Agent, or Firm*—Quarles & Brady LLP

[57] ABSTRACT

A vehicle anti-theft system that disables a vehicle engine upon detection of an unauthorized vehicle start-up, after the engine is running, by disconnecting the vehicle battery and draining the alternator voltage to ground through a resistor. A fob transmitter transmits a coded frequency signal that is received by a receiver associated with the anti-theft system to arm the system. When the system is armed, it monitors whether the engine is running and has been recently started using a combination of vibration detection, voltage fluctuations in the battery voltage and the actual battery voltage. If the system determines that the engine is running and has been recently started, the system will issue a first command that opens a relay switch to disconnect the battery and a second command that closes a switch to connect the alternator to ground through the resistor. In order to prevent a vehicle from being jump started by using a second battery, the system includes a reset clock and associated delay that resets the decision to connect the alternator to ground at periodic intervals so as to repeatedly test for the presence of the second battery and cause the engine to stall after the second battery is disconnected. A driver entry detection portion of the system determines whether someone has entered the vehicle, and issues a chirp signal to notify the occupant that the system is armed. A state of charge algorithm is also provided to determine whether the battery voltage has reached a minimum state of charge for reliably starting the vehicle, and also disconnect the battery once the minimum level has been reached.

39 Claims, 4 Drawing Sheets

U.S. PATENT DOCUMENTS

| | | |
|---|---|---|
| 4,902,956 | 2/1990 | Sloan . |
| 4,958,084 | 9/1990 | Carlo et al. . |
| 4,992,670 | 2/1991 | Pastor . |
| 5,023,591 | 6/1991 | Edwards . |
| 5,025,136 | 6/1991 | Doege et al. ........................ 123/179 B |
| 5,049,867 | 9/1991 | Stouffer . |
| 5,059,945 | 10/1991 | Scheele et al. ........................ 340/426 |
| 5,078,104 | 1/1992 | Peterson, Jr. ........................ 123/179.4 |
| 5,089,762 | 2/1992 | Sloan . |
| 5,094,199 | 3/1992 | Griffin ................................ 123/179.1 |
| 5,128,551 | 7/1992 | Clokie . |
| 5,130,659 | 7/1992 | Sloan ...................................... 324/435 |
| 5,132,551 | 7/1992 | Carlo et al. . |
| 5,184,023 | 2/1993 | Carlo et al. . |
| 5,191,228 | 3/1993 | Sloan . |
| 5,200,877 | 4/1993 | Betton et al. . |
| 5,287,006 | 2/1994 | Carlo et al. . |
| 5,299,194 | 3/1994 | Ichii et al. . |
| 5,332,958 | 7/1994 | Sloan . |
| 5,360,997 | 11/1994 | Watson ................................... 307/10.1 |
| 5,397,925 | 3/1995 | Carlo et al. . |
| 5,404,129 | 4/1995 | Novak et al. . |
| 5,408,211 | 4/1995 | Hall . |
| 5,438,311 | 8/1995 | Lane, Sr. ................................. 340/426 |
| 5,449,957 | 9/1995 | Carlo . |
| 5,481,253 | 1/1996 | Phelan et al. . |
| 5,492,087 | 2/1996 | Rolland, Jr. . |
| 5,498,486 | 3/1996 | Gatehouse . |
| 5,519,255 | 5/1996 | Burtch et al. . |
| 5,528,085 | 6/1996 | Hsiang ................................... 307/10.2 |
| 5,539,260 | 7/1996 | Khangura et al. . |
| 5,552,642 | 9/1996 | Dougherty et al. . |
| 5,554,891 | 9/1996 | Shimizu et al. . |
| 5,572,185 | 11/1996 | Chen et al. . |
| 5,576,686 | 11/1996 | Westermeir et al. . |
| 5,581,231 | 12/1996 | Cardoso . |
| 5,600,979 | 2/1997 | Winner et al. . |
| 5,604,384 | 2/1997 | Carlo et al. . |
| 5,623,245 | 4/1997 | Gilmore . |
| 5,635,899 | 6/1997 | Carlo et al. ............................ 340/426 |
| 5,635,901 | 6/1997 | Weinblatt . |
| 5,637,929 | 6/1997 | Treharne . |
| 5,638,270 | 6/1997 | Maeda et al. . |
| 5,654,688 | 8/1997 | Allen et al. . |

ANTI-THEFT SYSTEM FOR DISABLING A VEHICLE ENGINE

BACKGROUND OF THE INVENTION

1. Field of the Invention

This invention relates generally to a vehicle anti-theft system for preventing theft of a vehicle and, more particularly, to a vehicle anti-theft system that disables the vehicle's engine after the engine is running, if an unauthorized vehicle start-up has occurred, by disconnecting the vehicle battery and draining the alternator voltage to ground.

2. Discussion of the Related Art

Theft of vehicles is a very significant and important problem facing vehicle owners. To address this problem, many different types of anti-theft systems that attempt to prevent a potential thief from stealing a vehicle are known in the art. However, as the sophistication of the anti-theft systems increases, the sophistication and ingenuity of the thieves also increases. The different types of anti-theft systems include steering wheel locks, alarm systems, and devices that disable certain essential components of the vehicle ignition system when an attempted theft is recognized. The systems that disable essential components of the vehicle ignition system generally include systems that interrupt the vehicle ignition circuit so as to prevent the vehicle from actually starting. One particular system includes providing an authorization circuit within the vehicle ignition key that is electrically coupled to the ignition circuit when the key is put into the ignition switch to provide a signal of an authorized user to enable the vehicle to be started.

Some of the known anti-theft systems attempt to prevent theft of a vehicle by disconnecting the vehicle battery from the ignition circuit to prevent the vehicle from being started, when an unauthorized ignition is detected. For example, U.S. Pat. No. 4,958,084 issued to Carlo et al. discloses an anti-theft device that prevents the vehicle from being started by disconnecting the vehicle battery from the ignition circuit upon detection of a high current flow indicative of an attempt to start the vehicle. The Carlo anti-theft device includes a power switch having a first condition connecting the battery to the ignition circuit to allow the battery to deliver power to the ignition circuit and a second condition that disconnects the battery from the ignition circuit. The power switch is shifted from the first condition to the second condition in response to a flow of a substantial amount of current through the ignition circuit that shows an attempt to start the vehicle. An externally received coded command signal from a hand-held transmitter deactivates the shifting of the power switch to the second condition when the high current flow is detected to enable the authorized user to start the vehicle.

The Carlo anti-theft system suffers from a number of drawbacks that can be improved upon. For example, because the Carlo anti-theft system senses the large amount of current (about 800 amps) that is present during ignition just prior to starting the vehicle engine, high integrity and robust mechanical elements are necessary to disconnect the vehicle battery at that time. Therefore, the Carlo power switch must be a heavy-duty and expensive mechanical switch. Further, because the Carlo anti-theft system only disconnects the battery from the ignition circuit to prevent the engine from being started, the system is susceptible to jump starting to complete the theft, where a second battery is connected to the vehicle starting system. The second battery would not be disconnected from the starting circuit by the anti-theft system. Also, because modern vehicles usually start very quickly after the ignition key has been turned, the chance that the Carlo anti-theft system will be able to sense the high current in time to prevent the vehicle engine from starting in these vehicles is reduced.

What is needed is an anti-theft system that disables a vehicle engine by disconnecting the battery from the vehicle ignition system, but does not suffer from the drawbacks discussed above. It is therefore an object of the present invention to provide such an anti-theft system.

SUMMARY OF THE INVENTION

In accordance with the teachings of the present invention, a vehicle anti-theft system is disclosed that disables a vehicle engine upon detection of an unauthorized vehicle start-up, after the engine is running, by disconnecting the vehicle battery and draining the alternator voltage to ground through a resistor. A fob transmitter transmits a coded frequency signal that is received by a receiver associated with the anti-theft system. If the system is armed, the signal will cause the system to become disarmed so that the engine can be freely started. If the system is disarmed, the signal will cause the system to become armed. When the system is armed, it monitors whether the engine is running and has been recently started using a combination of detection of vibrations, detection of voltage fluctuations in the battery voltage, and the actual battery voltage. If the system determines that the engine is running and has been recently started, the system will issue a first command that opens a first switch to disconnect the battery, and a second command that closes a second switch to connect the alternator to ground through the resistor to pull down the alternator voltage and stall the engine. In order to prevent the vehicle from being jump started by using a second battery, the system includes a reset clock and associated delay that resets the decision to connect the alternator to ground at periodic intervals so as to repeatedly test for the presence of the second battery, and then cause the engine to stall if either the second battery is disconnected or resistance of the jump start cables and connectors is high. A driver entry detection portion of the system determines whether someone has entered the vehicle, and issues a chirp signal to notify the occupant that the system is armed. A state of charge algorithm is also provided to determine whether the battery state of charge (SOC) has reached a minimum safe SOC for reliably starting the vehicle. The algorithm disconnects the battery once the minimum SOC has been reached.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to an anti-theft system that prevents vehicle theft by disabling the vehicle engine after it has been started is merely exemplary in nature and is in no way intended to limit the invention or its applications or uses.

Figure 1:
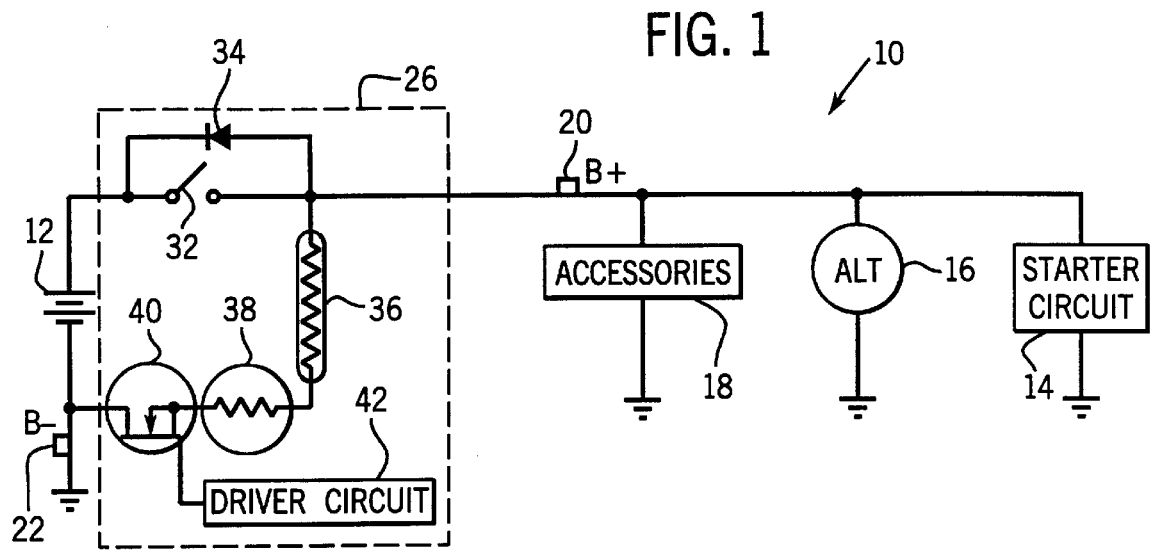
FIG. 1 is a schematic block diagram of a vehicle anti-theft system that disables the vehicle engine after it has been started, according to an embodiment of the present invention.

FIG. 1 is a schematic block diagram of a vehicle electrical system 10 of a vehicle (not shown) that includes a vehicle battery 12 for storing electrical power, a starter circuit 14, an alternator 16 and electrical accessories 18. The battery 12 is a typical 12-volt lead acid battery of the type used in most vehicles, and its operation and configuration is well known in the art. The battery 12 includes a positive battery terminal post 20 that is connected to a positive battery cable (not shown) and a negative battery terminal post 22 that is connected to a negative battery cable (not shown). Each of the starter circuit 14, the alternator 16 and the electrical accessories 18 are connected in parallel with the battery 12. The starter circuit 14 typically would include an ignition switch (not shown) and a starting motor (not shown) which operate to turn a fly wheel (not shown) under power from the battery 12 when the ignition switch is closed to start the vehicle engine (not shown). The alternator 16 provides electrical power to the various vehicle electrical systems once the vehicle engine is operating, and recharges the battery 12. The vehicle electrical accessories 18 can be any other electrical device or system in the vehicle, such as headlights, dome light, radio, horn, clock, etc. The operation of the starter circuit 14, the alternator 16 and the electrical accessories 18 are well known in the art.

Figure 2:
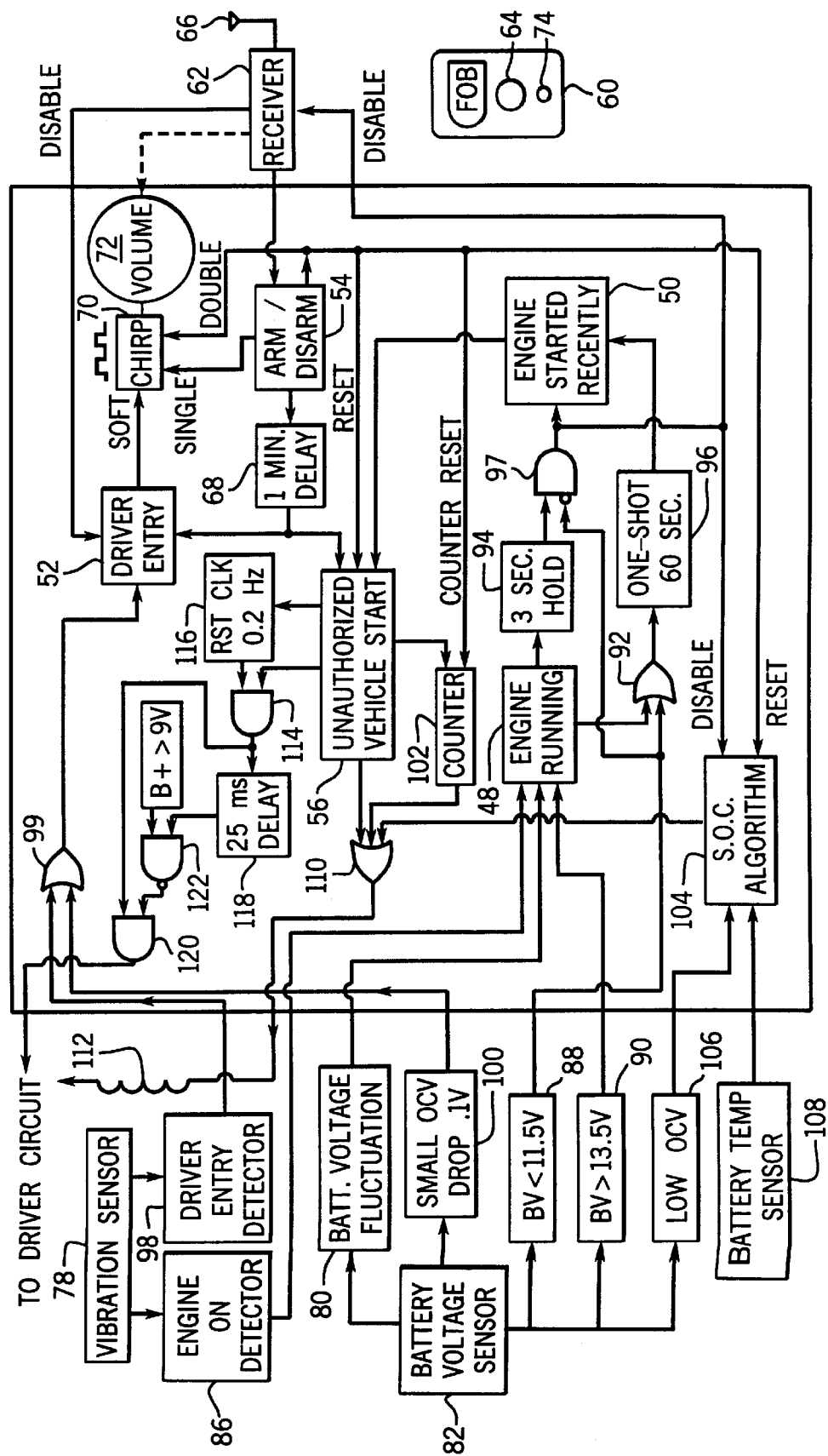
FIG. 2 is a schematic block diagram of a control portion of the anti-theft system shown in FIG. 1.

The vehicle electrical system 10 also includes an anti-theft system 26, according to an embodiment of the present invention, that disables the vehicle engine after it has been started, if an unauthorized vehicle start is detected, as will be discussed in detail below. FIG. 2 shows a schematic block diagram of a control portion 28 of the system 26 that determines whether the anti-theft system 26 is armed or disarmed, and appropriately disables the engine when an unauthorized vehicle start-up occurs.

The anti-theft system 26 includes a switch 32, for example a normally closed relay switch, electrically connected in series with the battery 12 that is used to disconnect battery power applied to the electrical system 10 when the system 26 disables the engine. The switch 32 can be a mechanical switch or a solid state switch in accordance with the invention. A diode 34 is electrically connected in parallel with the switch 32, and protects the alternator 16 and the vehicle accessories 18 against any excessive surge voltage from the alternator 16 upon its disconnection from the battery 12. A dissipation resistor 36, a positive temperature coefficient (PTC) device 38 and a solid state transistor switch 40, such as a MOSFET switch, are electrically connected in series with each other, and are individually electrically connected in parallel with the battery 12 and the switch 32, as shown. The switch 40 can also be a separate relay switch. The PTC device 38 is optional as it is not required for the anti-theft system 26 to work. A driver circuit 42 has an output connected to the gate terminal of the switch 40, and causes the switch 40 to turn on so as to electrically connect the resistor 36, the PTC device 38 and the switch 40 to the positive and negative battery terminals.

In operation, the vehicle is started by the starter circuit 14 when the ignition switch is closed by powering the starter motor to rotate the flywheel. When the vehicle engine starts, the alternator 16 is energized to keep the engine running and the flywheel rotating. The control portion 28 senses that the engine is running. If the anti-theft system 26 is armed, the system 26 assumes that the engine start-up is unauthorized, and possibly a vehicle theft is occurring, so the control portion 28 causes the switch 32 to open to disconnect the battery 12 from the electrical system 10. Additionally, the control portion 28 causes the driver circuit 42 to close the switch 40 to electrically connect the resistor 36 to ground through the negative battery terminal in a manner that prevents engine operation after being jump started by a second battery, as will be discussed below. When the resistor 36 is connected to ground and the switch 32 is open, the alternator voltage is pulled to ground and dissipates through the resistor 36 so as to prevent power from being applied to the system 10, thus stalling the vehicle engine. The optional PTC device 38 acts as a circuit breaker in the event that the switch 40 fails. If the PTC device 38 heats up to a certain temperature as a result of high current from the alternator 16, the PTC device 38 will create an open circuit. In one embodiment, the control portion 28 determines whether to open the switch 32 and close the switch 40 to disable the engine after about one second.

The control portion 28 is microprocessor controlled by a microprocessor 46. The operation of the microprocessor 46 for the anti-theft system 26 is depicted by a series of status boxes and logic gates, as shown. However, as will be appreciated by those skilled in the art, the various operations of the microprocessor 46 described herein can be performed in microcode or by discreet components where applicable. Any suitable combination of microprocessor hardware, software and discreet components configured on an integrated circuit board for the purposes of the present invention can be used. The microprocessor 46 determines a number of status conditions represented by different boxes in the microprocessor 46 to control the operation of the system 26. The various status conditions are defined by an engine running status box 48, an engine started recently status box 50, a driver entry status box 52, an arm/disarm status box 54, and an unauthorized vehicle start status box 56. The discussion below of the specific operation of the anti-theft system 26 of the invention will include reference to certain delay times, signal hold times, battery voltages, clock frequencies, etc. However, as will be appreciated by those skilled in the art, these values are merely examples of practical values for performing the operation of the invention for the current technology, and are in no way intended to limit the operation of the anti-theft system 26 according to the invention.

According to a current embodiment of the anti-theft system 26, a fob transmitter 60 is used to transmit a coded frequency signal to be received by a receiver 62 to arm or disarm the system 26. Upon activation of a push button switch 64, the transmitter 60 generates and transmits a unique coded RF signal that is received by an antenna 66 and deciphered by the receiver 62 to determine if it is a valid signal. Fob transmitters of the type of the transmitter 60 are well known in the art, and are typically used in remote RF keyless entry systems for activating certain vehicle functions, such as locking and unlocking a vehicle door, or unlocking a vehicle trunk, from a remote location. For the system 26 being described herein, the transmitter 60 is a separate transmitter than the transmitter used with a remote RF keyless entry system. Therefore, the vehicle operator is required to transmit a separate signal to arm and disarm the system 26 than the signal that may be used to unlock or lock the vehicle doors. However, it is well within the scope of the present invention to use the transmitted RF signal from the keyless entry system associated with the vehicle to arm or disarm the system 26. For example, the receiver 62 may include the capability to learn the coded frequency of the vehicle's remote keyless entry system so that the receiver 62 responded to the RF signal from the keyless entry system transmitter. Receivers with such learning capabilities are known in the art. Because the fob transmitter 60 is of the type well known in the art, its operation and components need not be described herein.

When the receiver 62 receives a valid coded signal from the transmitter 60, it outputs a signal to the arm/disarm status box 54 to either arm or disarm the system 26. If the system 26 is currently armed, the control portion 28 will cause the system 26 to become disarmed, allowing the vehicle engine to be freely started. However, if the system 26 is currently disarmed, receipt of the valid coded signal will cause the control portion 28 to arm the system, and prevent the engine from remaining running if a vehicle start-up is detected.

If the signal causes the system 26 to become armed, the arm/disarm status box 54 will send a signal to the unauthorized vehicle start status box 56 which is delayed by one minute as set by a delay system 68. Additionally, the arm/disarm status box 54 will send a signal to a chirp transducer 70 to cause it to emit a single chirp so as to provide an audible signal to notify the vehicle operator that the system 26 is in the armed state. The one minute delay provided before the system 26 is actually armed is desirable because this gives the vehicle operator time to leave the vehicle before the system is armed so that operator movement within the vehicle will not disrupt the system 26. Also, the single chirp signal can be sounded after the one minute delay period so the operator is not exposed to the chirp while in the vehicle, reducing the annoyance.

If the signal causes the system 26 to become disarmed, the arm/disarm status box 54 will immediately send a disable signal to the unauthorized vehicle start status box 56. Additionally, the arm/disarm status box 54 will send a signal to the chirp transducer 70 to cause it to emit a double chirp so as to provide an audible signal showing that the system 26 is in the disarmed state to notify the vehicle operator. A volume control switch 72 is provided to increase, decrease or eliminate the chirp, depending on operator preference, and can be activated through the receiver 62 by activating a button 74 on the transmitter 60 that sends out a second coded signal. Other techniques can be used to control the volume of the chirp, such as by holding the push button switch 64 continuously for a period of time.

In order for the control portion 28 to issue the commands that will disable the vehicle engine when the system 26 is armed, it is necessary for the control portion 28 to know if the engine is running and whether it has been recently started. In accordance with the invention, the control portion 28 uses different combinations of four detections to determine whether the engine is running and has been recently started. This is by way of example in that any number of detections greater or less than four can be used depending on the level of redundancy desired. The detections according to the invention include a vibration detection sensed by a vibration sensor 78, battery voltage fluctuations sensed by a battery voltage fluctuation sensor 80, and separate battery voltages sensed by a battery voltage sensor 82. Battery voltage fluctuations are evidence of the vehicle engine being started because of the various drains on the battery 12 at vehicle start-up. If the battery voltage is greater than approximately 13.5 volts, it is an indication that the engine is running because the alternator 16 will be charging the battery 12. Vehicle vibrations are an indication that the engine has started because of the vibrations to the vehicle caused by the engine. If the battery voltage falls below 11.5 volts, it is an indication that the engine has been recently started because of the significant current drain on the battery 12 when the vehicle engine is started.

The vibration sensor 78 sends an output signal to an engine-on detector 86 when it senses a vibration. The engine-on detector 86 then sends an output signal to the engine running status box 48. The battery voltage sensor 82 outputs a battery voltage signal indicative of the battery voltage to a voltage detector 88, a voltage detector 90 and the battery voltage fluctuation sensor 80. The battery voltage fluctuation sensor 80 sends an output signal to the engine running status box 48 when it detects significant fluctuations in the battery voltage. The voltage detector 90 sends an output signal to the engine running status box 48 if the battery voltage is greater than 13.5 volts. The voltage detector 88 sends an output signal to an input of an OR gate 92 if the battery voltage is less than 11.5 volts. If the engine running status box 48 receives all of the engine running signals from the engine-on detector 86, the battery voltage fluctuation sensor 80 and the detector 90, it also sends an output signal to an input of the OR gate 92. There is a significant level of redundancy in the determination of whether the engine has been started and is running to increase the system accuracy and reliability in the event that one or more of the engine running detection techniques or sensors is disabled, defective or otherwise inoperative.

When the engine running status box 48 receives two of the three engine running signals, it provides an engine running output signal to a three second hold system 94. The hold system 94 holds the engine running output signal for three seconds beyond the time the engine running status box 48 receives the two out of three signals to provide system integrity in the event that one of the input signals to the engine running status box 48 fluctuates or stops. The OR gate 92 sends an output signal to a sixty second one-shot system 96 if it receives all three of the engine running signals or receives the signal from the detector 88. The sixty second one-shot system 96 holds the output from the OR gate 92 high for sixty seconds after it is received. The output signal from the hold system 94 and an inverted signal from the voltage detector 88 are applied as inputs to an AND gate 97. If two of the three engine running signals are high and the battery voltage is greater than 11.5 volts, the output of the AND gate 97 will go high. The AND gate 97 is provided to allow the engine to be started before the control portion 28 issues an unauthorized vehicle start command. When the battery 12 rotates the flywheel during cranking the battery voltage falls below 11.5 volts. When the engine starts, the battery voltage then goes above 11.5 volts, allowing the AND gate 97 to go high. This also prevents the output of switch 32 from opening during the high current at start-up.

Both the output signal from the AND gate 97 and the output signal from the one-shot system 96 are applied to the engine started recently status box 50. The engine started recently status box 50 sends an output signal to the unauthorized vehicle start status box 56 that the engine is running and has been recently started when it receives both the output signals from the hold system 94 and the one-shot system 96. If the system 26 is armed, the unauthorized vehicle start status 56 will issue the appropriate signals to disable the engine, as will be further discussed below. The high output signal from the AND gate 97 is also sent as a disable signal to disable the receiver 62 and prevent it from acting on any received transmission signals from the transmitter 60 that could disrupt the operation of the system 26 when the engine is running.

The anti-theft system 26 of the invention also provides capabilities to determine when a vehicle occupant or driver has entered the vehicle. This is important to allow the authorized vehicle operator to know that the anti-theft system 26 is armed prior to the operator turning the ignition key to start the vehicle. To provide this driver entry detection, the vibration sensor 78 also sends the vibration signal to a driver entry detector 98. The driver entry detector 98 then sends an output signal to an OR gate 99. Additionally, the battery voltage sensor 82 sends the battery voltage signal to a voltage detector 100 that determines small open circuit voltage (OCV) changes of the battery voltage on the order 0.1 volts. A small drop in the battery voltage is indicative of an interior light turning on or other electrical system turning on as would occur when someone enters the vehicle. The detector 100 also sends an output signal to the OR gate 99. If the OR gate 99 receives either of these two input signals, it sends a signal to the driver entry status box 52. The driver entry status box 52 then sends a signal to the chirp transducer 70 to sound a soft chirp at short intervals in time for a predetermined period, giving an audible indication to the vehicle operator that the system 26 is armed. When the system 26 is disarmed, a disable signal from the receiver 62 is applied to the driver entry status box 52 to prevent the soft chirp. When the system 26 is armed, the delay system 68 sends an output signal to the driver entry status box 52 that the system 26 is armed.

A counter 102 is provided to give a count of the number of times an unauthorized vehicle start has been attempted. Each time the unauthorized vehicle start status box 56 receives an output signal from the engine started recently status box 50 when the system 26 is armed, it sends an output signal to the counter 102 that increases the count value. Each time the system 26 is disarmed, the arm/disarm status box 54 sends a counter reset signal to the counter 102 that resets the counter 102 to zero or some reference value. In one embodiment, the maximum count value is five counts, after which the counter 102 must be reset before the vehicle engine can be started.

The anti-theft system 26 also includes capabilities to prevent further state of charge (SOC) decline of the battery 12 once the battery state of charge falls below a predetermined level. The predetermined level is determined as a state of charge where a further decrease of the battery state of charge may not provide enough power to start the vehicle engine. An (SOC) algorithm box 104 is provided that includes an algorithm to determine when the battery SOC has reached this level. Algorithms of this type are known in the art. For example, see U.S. Pat. No. 4,902,956 issued to Sloan on Feb. 20, 1990. The battery voltage sensor 82 also outputs the battery voltage signal to a low OCV detector 106. When the open circuit voltage of the battery 12 falls below a predetermined value, the detector 106 sends an output signal to the SOC algorithm box 104. Additionally, a battery temperature sensor 108 sends an output signal indicative of the temperature of the battery 12 to the algorithm box 104. This enables the SOC algorithm to adjust the predetermined voltage level dependent on the battery temperature. The SOC algorithm is reset when the receiver 62 receives a valid coded signal that disarms the system 26 to allow the vehicle to be started so that if the SOC algorithm has issued a command of low battery state of charge, the engine can be started. Additionally, the SOC algorithm is disabled by a signal from the hold system 94 when the engine is running.

An OR gate 110 is provided that receives three inputs, one from the unauthorized vehicle start status box 56, one from the counter 102, and one from the SOC algorithm box 104. If any of these three inputs goes high, the OR gate 110 sends an output signal to a coil 112 to open the switch 32 and disconnect the battery 12, as discussed above. Therefore, if the unauthorized vehicle start box 56 receives a signal that the engine has been recently started from the status box 50 when the system 26 is armed, it will issue the output signal that opens the switch 32. Likewise, if the counter 102 reaches the maximum count value, indicating consecutive unauthorized attempts to start the vehicle, the OR gate 110 will also open the switch 32. And, if the battery voltage dissipates to a certain safe level, the output signal from the SOC algorithm box 104 will open the switch 32. As long as the OR gate 110 is receiving a high input signal, the switch 32 will be open.

The system 26 also includes capabilities to detect the presence of a second battery, such as would be used during a jump start in an attempt to thwart the anti-theft system 26. The control portion 28 incorporates this feature into the process of closing the switch 40 to drain the alternator voltage. When the system 26 is armed and the unauthorized vehicle start status box 56 receives the signal from the engine started recently status box 50, the unauthorized vehicle start status box 56 sends an output signal to an input of an AND gate 114 and a reset clock circuit 116. The reset clock circuit 116 includes a reset clock that is reset to zero by the signal from the unauthorized vehicle start status box 50. The clock signal from the reset clock is applied to another input of the AND gate 114. In this embodiment, the reset clock is a 0.2 Hz clock having pulse widths of about one second such that when the clock is reset by the signal from the status box 56, the clock output initially remains low for one second. The reset clock can provide other time intervals, such as one second high and three seconds low. Thus, the output of the AND gate 114 also remains low during this time period, i.e., the first one-half time period of the clock.

The input to the engine started recently status box 50 from the hold system 94 will be high for at least three seconds, and the input to the engine started recently status box 50 from the OR gate 92 will be high for at least sixty seconds. When the clock pulse goes high one second after being reset, the output of the AND gate 114 also goes high. This gives the one second lag time from the time when the engine is started until the time the system 26 causes it to stall. Thus, the high currents associated with vehicle start-up are not applied to the resistor 36 and the switch 40. To test whether a second battery has connected, the output of the AND gate 114 is applied to a 25 ms delay circuit 118 and an input to a second AND gate 120. The delay gives the switch 40 time to close and the alternator 16 to dissipate through the resistor 36. An output signal from the delay circuit 118 is applied to an input of a NAND gate 122 and a determination of whether the positive battery voltage signal of the battery 12 is greater than 9 volts is applied to another input of the NAND gate 122. This also gives a determination of whether the alternator voltage has dropped below 9 volts. If the positive battery voltage is greater than 9 volts, the input to the NAND gate 122 is high. The output of the NAND gate 122 is applied to another input of the second AND gate 120. Therefore, when the output of the AND gate 114 initially goes high, prior to the lapse of the 25 ms delay, the output of the NAND gate 122 is high because at least one of the inputs to the gate 122 is low. In this logic situation, the output of the NAND gate 122 is high causing the output of the AND gate 120 to be high. When the output of the AND gate 120 is high, the driver circuit 42 closes the switch 40 to connect the resistor 36 to ground.

After the 25 ms delay has passed, the input from the AND gate 114 to the NAND gate 122 is high because the reset clock pulse is still high. Because the switch 32 has been open for more than a second and the alternator 16 has been drained for 25 ms, the positive battery voltage should be less than 9 volts by this time. If the battery voltage is less than 9 volts when the 25 ms delay has elapsed, then the output of the NAND gate 122 would remain high for the duration of the clock cycle when the reset clock is high because at least one input to the NAND gate 122 is still low. On the next low clock pulse of the reset clock, the output of the AND gate 114 goes low, causing the second AND gate 120 to go low, thus opening the switch 40. However, by this time the engine has been stalled. The system is now ready for the next unauthorized vehicle start-up.

If a second battery has been connected to the battery 12, the positive battery voltage at the post 20 should be greater than 9 volts. This will cause the output of the NAND gate 122 to go low during the positive cycle of the clock after the 25 ms delay, which is turn causes the output of the AND gate 120 to go low, opening the switch 40. The time that the output of the second AND gate 120 is high during the 25 ms delay, if the battery voltage is greater than 9 volts, does not provide enough time to stall the engine. Thus, the engine does not stall when the second battery is connected. The NAND gate 122 causes the switch 40 to open before the engine stalls, protecting the resistor 36 from being burnt out by the second battery. The engine remains running and the output signal from the unauthorized vehicle start status box 56 remains high still indicating an unauthorized vehicle start. After the one second high clock cycle has passed, the output of the AND gate 114 goes low which causes the output of the AND gate 120 to remain low. When the clock signal goes high again, the output of the AND gate 114 goes from low to high which is again delayed by the delay system 118 causing the output of the NAND gate 122 to be high. Therefore, on each high clock pulse signal, the control portion 28 tests whether a second battery has been connected to the engine, and keeps the driver circuit 42 from closing the switch 40 while the second battery is connected. When the second battery is finally removed, the engine will then stall on the next positive clock pulse.

Figure 3:
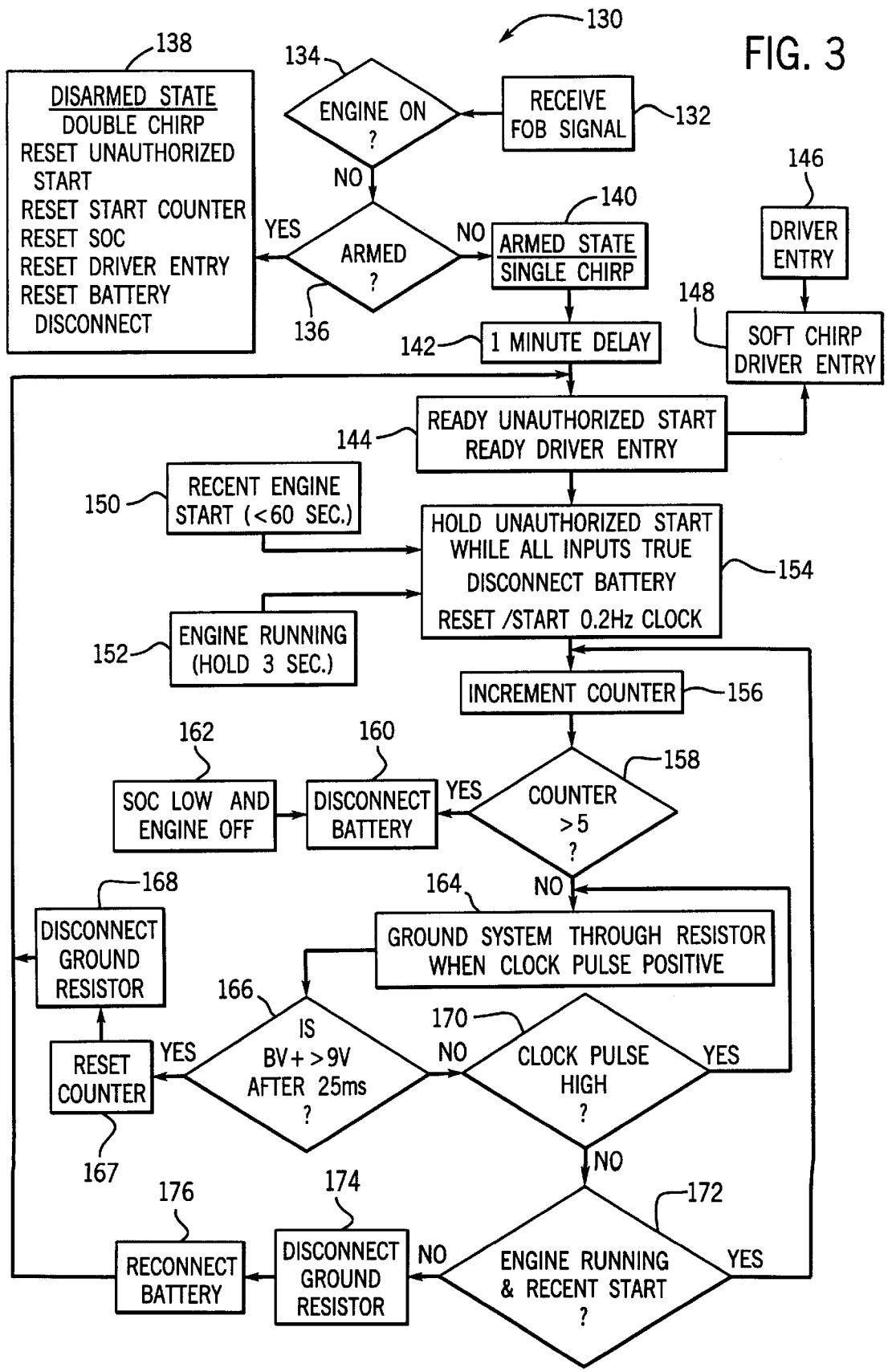
FIG. 3 is a flow chart diagram showing the operation of the anti-theft system depicted in FIGS. 1 and 2, according to an embodiment of the present invention.

FIG. 3 shows a flow chart diagram 130 that further describes the operation of the the anti-theft system 26 discussed above. When the control portion 28 receives the transmitter signal from the fob transmitter 60 at step 132, it determines whether the vehicle engine is on at decision diamond 134. If the engine is running, the receiver 62 should be disabled so the system 26 doesn't do anything. If the vehicle engine is not running, the control portion 28 then determines whether the system 26 is armed at decision diamond 136. If the system 26 is currently armed, the control portion 28 will disarm the system 26, cause the transducer 70 to emit a double chirp, reset the unauthorized vehicle start box 56, reset the counter 102, reset the SOC algorithm 104, reset the driver entry status box 52, and reset the battery disconnect as shown at step 138 and discussed above. In this condition, the vehicle engine can be freely started. If the system 26 is currently disarmed, the control portion 28 will arm the system 26 and cause the transducer 70 to emit a single chirp as shown at step 140. The armed state is not actually activated until a predetermined delay period has passed, such as one minute, as indicated by step 142.

The system 26 is actually armed when the unauthorized vehicle start box 56 and the driver entry box 52 are activated and ready as shown at step 144. In this condition, the control portion 28 is set to monitor the various conditions, as discussed above, when the system 26 is armed. If the system 26 senses that the vehicle has been entered, as indicated by step 146, while the system 26 is armed, the driver entry status box 52 will cause the transducer 70 to emit the soft chirp to notify the driver that the system 26 is armed, as indicated at step 148.

When in the armed state, the control portion 28 may detect a recent engine start, as indicated at step 150, and the engine is running, as indicated at step 152, as applied to the engine started recently status box 50 and discussed above. The unauthorized vehicle start status box 56 will then proceed to disable the engine, as indicated by step 154. In this condition, the unauthorized vehicle start status box 56 will hold the unauthorized start while the recent engine start signal and the engine running signal are high, will disconnect the battery through the OR gate 110 and the switch 32, and reset the reset clock to zero. The control portion 28 will also increment the counter 102, as indicated by step 156, and then determine if the counter 102 has reached a predetermined number, here five counts, as indicated by decision diamond 158. As discussed above, when the system 26 is disarmed at step 138, the counter 102 is reset. If the counter 102 has reached a value greater than five, the control portion 28 proceeds to disconnect the battery 12 through the OR gate 110, as indicated at step 160. Additionally, if the battery open circuit voltage falls below the predetermined value, as determined by the SOC algorithm status box 104 when the system 26 is armed, the control portion 28 will also disconnect the battery 12 through the OR gate 110 as indicated at step 162. When the battery 12 is disconnected in this manner by the switch 32, the control portion 28 does not close the switch 40 to connect the resistor 36 to ground.

If the counter 102 has not reached the maximum count number, the control portion 28 proceeds to ground the alternator 16 through the resistor 36 when the reset clock pulse goes high as indicated by step 164 and discussed above. Then, the control portion 28 determines if the battery voltage is greater than 9 volts after the 25 ms delay by the delay circuit 118 as applied to the input of the NAND gate 122, as indicated by decision diamond 166. If the battery voltage is greater than 9 volts after the delay, then the control portion 28 resets the counter 102 at step 167, and disconnects the resistor 36 from ground (opens switch 40), through the AND gate 120, as indicated by step 168, and then returns to the step 144 to indicate that the system 26 is ready to determine an unauthorized vehicle start. The step of decision diamond 166 is there to determine if the potential thief has connected a second battery to the vehicle, i.e., is trying to jump start the vehicle. If this is the case, the battery voltage will not go below 9 volts, and thus the resistor 36 will not be connected to ground. If the battery voltage is below 9 volts, then decision diamond 170 determines if the clock pulse of the reset clock is high. If the clock pulse is high, then the control portion 28 returns to the step of grounding the alternator 16 through the resistor 36 at step 164. If the clock pulse is low, then the control portion 28 determines if the engine is running and whether it is a recent engine start at decision diamond 172. If the engine is running and has been recently started, then the system increments the counter at step 146 and proceeds through the steps of disabling the engine as discussed above. If the engine is not running, then the control portion 28 disconnects the resistor 36 from ground at step 174 and reconnects the battery 12 by deenergizing the relay 32 at step 176. This indicates that the engine stall was successful, and now the system 26 is ready to be disabled again if the potential thief attempts to restart the engine.

Figure 4:
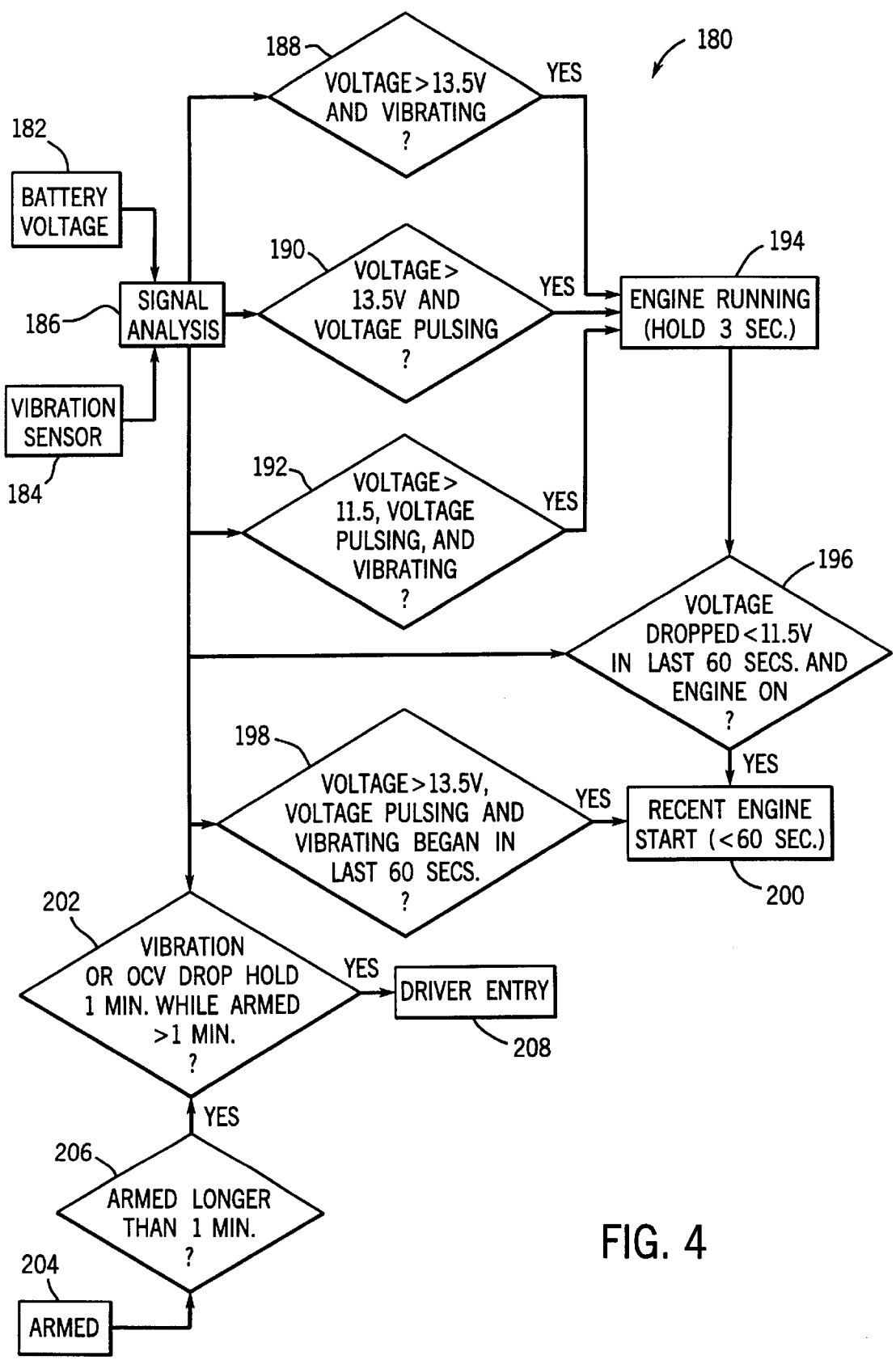
FIG. 4 is a second flow chart diagram showing a portion of the operation of the anti-theft system of the invention that determines the engine running status.

FIG. 4 is a flow chart diagram 180 showing the logic and operation used to determine if the engine is running at the engine running status box 48, and whether the engine has been recently started at the engine recently started status box 50. The battery voltage signal from the battery voltage monitor 82, provided at step 182, and the output signal from the vibration sensor 58, provided at step 184, are applied to a signal analysis step 186 to determine the battery voltage, battery voltage fluctuations, and the vibration status. An output of the signal analysis step 186 giving the battery voltage and vehicle vibration status is applied to a decision diamond 188 that determines if the battery voltage is above 13.5 volts and whether the vehicle is vibrating. The output from the single signal analysis step 186 is also applied to a decision diamond 190 that determines if the battery voltage is greater than 13.5 volts and whether the battery voltage is fluctuating. Additionally, the output of the signal analysis step 186 is applied to a decision diamond 192 to determine if the battery voltage is fluctuating and whether the vehicle is vibrating. The yes outputs from the decision diamonds 188, 190 or 192 are applied to an engine running box 194, which is held for at least three seconds. The outputs from the signal analysis step 186 and the engine running box 194 are applied to a decision diamond 196 that determines if the battery voltage has dropped below 11.5 volts in the last sixty seconds and whether the engine is on. This represents the function of the OR gate 92. The output of the signal analysis step 186 is also applied to a decision diamond 198 that determines if the battery voltage is greater than 13.5 volts, the battery voltage is fluctuating, and a vibration is occurring. The outputs from the decision diamonds 196 and 198 are applied to a recent engine start box 200 giving a signal that the engine has been recently started and performs the function of the engine started recently status box 50.

The output of the signal analysis box 186 is also applied to a decision diamond 202 that determines driver entry. If the system 26 is armed at box 204 and has been armed longer than one minute at decision diamond 206, and a vehicle vibration has occurred or an open circuit voltage drop has occurred, the system 26 indicates a driver entry at box 208.

Figure 5:
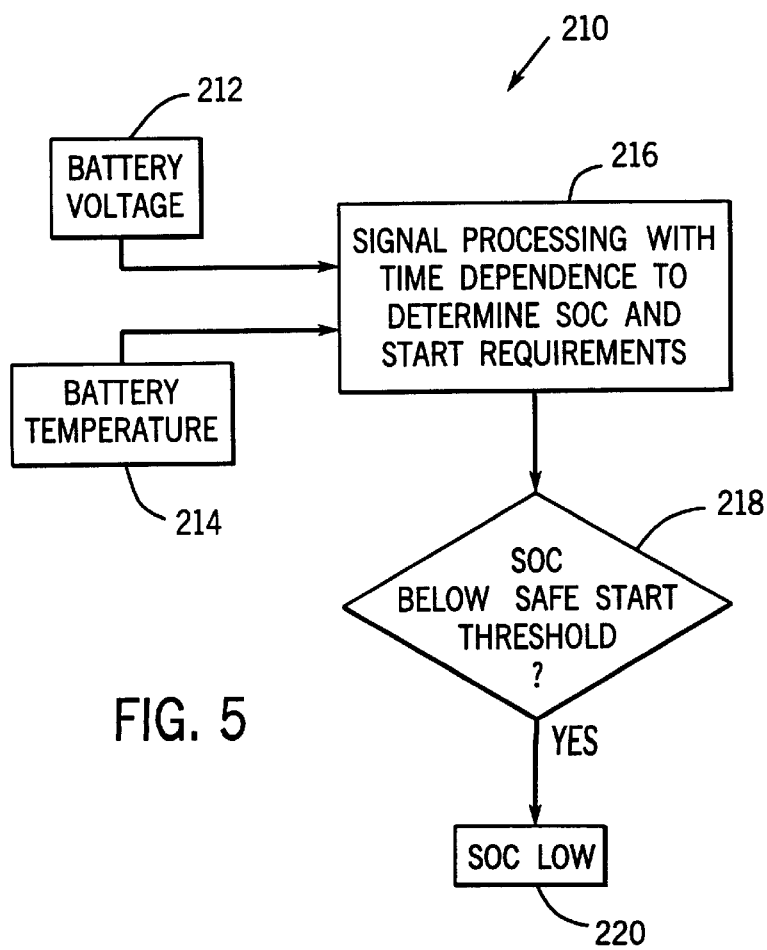
FIG. 5 is a third flow chart diagram showing another portion of the operation of the anti-theft system of the invention that monitors a safe battery voltage level.

FIG. 5 is a block diagram 210 showing the operation of the state of charge algorithm at box 104. The battery voltage at box 212 and the battery temperature at box 214 are applied to a signal processing box 216 that determines the state of charge and start requirements. These signals are applied to a decision diamond 218 that determines whether the state of charge voltage has fallen below a safe threshold. If the state of charge voltage has fallen below the safe threshold then a state of charge low signal is emitted at box 220 that opens the relay 32.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. In a vehicle having an engine, a battery producing a battery voltage, and an electrical system with an alternator which produces an alternator voltage, an improvement characterized by an anti-theft system for disabling the engine for theft deterrent purposes, said anti-theft system comprising:

a first circuit that can be closed to electrically connect the battery to the electrical system and opened to disconnect the battery from the electrical system;

a second circuit including a resistive element, said second circuit being capable of being closed to connect the resistive element to alternator thereby pulling the alternator voltage to ground, and capable of being opened to disconnect the resistive element from the alternator; and a control system establishing an armed state and a disarmed state of the anti-theft system, said control system including a detection system that detects whether the engine is running and whether the engine has been recently started, said control system opening the first circuit and closing the second circuit, when the engine is started while the anti-theft system is armed.

2. The anti-theft system according to claim 1 wherein the detection system includes a battery voltage sensor that measures the battery voltage, said control system responding to battery voltage decreasing below a predetermined value by providing an engine recently started signal which indicates that the engine has been recently started.

3. The anti-theft system according to claim 1 wherein the detection system includes a vibration sensor that detects vibrations of the vehicle, and a battery voltage sensor that measures the battery voltage.

4. The anti-theft system according to claim 3 wherein the battery voltage sensor provides a first output signal indicative of fluctuations of the battery voltage and a second output signal when the battery voltage goes above a predetermined value, and wherein the vibration sensor provides a vibration signal indicating vibration of the vehicle, said control system generating a first engine running output signal when at least two of the first output signal, the second output signal, and the vibration signal are present.

5. The anti-theft system according to claim 4 wherein further including a hold system which receives and holds the first engine running signal for a predefined period of time.

6. The anti-theft system according to claim 4 wherein the battery voltage sensor provides a third output signal when the battery voltage goes below a predetermined voltage value, said control system generating a second engine running output signal either when the first output signal, the second output signal and the vibration signal are all present, or when the third output signal is present.

7. The anti-theft system according to claim 6 wherein the second engine running output signal is applied to a one-shot circuit that maintains the second engine running output signal for a predetermined period of time.

8. The anti-theft system according to claim 6 wherein the control system generates an engine recently started signal in response to a combination of the first and second engine running output signals.

9. The anti-theft system according to claim 1 wherein the control system includes a low battery state of charge system that provides a signal that opens the first circuit when the battery state of charge decreases below a predetermined charge level.

10. The anti-theft system according to claim 9 wherein the low battery state of charge system includes a state of charge algorithm which determines the predetermined charge level in response to a voltage signal from a battery voltage sensor and a battery temperature signal from a battery temperature sensor.

11. The anti-theft system according to claim 1 wherein the control system further comprises:

a vibration sensor attached to the vehicle to produce a vibration signal indicating that a person has entered the vehicle;

a battery voltage sensor which produces a sensor signal indicating a decease in voltage from the battery; and a driver entry system connected to the vibration sensor and the battery voltage sensor provide a signal that the anti-theft system is armed in response to either the vibration signal or the sensor signal.

12. The anti-theft system according to claim 1 further comprising a receiver responsive to a remote RF transmission signal, said control system arming the anti-theft system in response to receipt of the remote RF transmission signal when the anti-theft system is unarmed, and unarming the anti-theft system in response to receipt of the remote RF transmission signal when the anti-theft system is armed.

13. The anti-theft system according to claim 12 wherein the control system delays the arming of the anti-theft system for a predetermined period of time after receipt of the remote RF transmission signal by the receiver.

14. The anti-theft system according to claim 1 wherein the control system includes a counter that counts how many consecutive times the engine is disabled, said counter providing an output signal that opens the first circuit upon reaching a predefined count value, said counter being reset when the anti-theft system is disarmed.

15. The anti-theft system according to claim 1 wherein the control system further includes a logic system that determines when to close the second circuit, said logic system including a reset clock that is reset upon an unauthorized vehicle start, said logic system closing the second circuit only after the first circuit is opened.

16. The anti-theft system according to claim 15 wherein the logic system includes a delay anti-theft system, wherein a signal in the logic system that determines when the second circuit is closed is delayed by the delay anti-theft system so as to test whether a battery voltage signal is above a predetermined level.

17. The anti-theft system according to claim 1 further comprising a sensor to determine whether voltage of the battery is below a predefined level, and said control system opening the second circuit if the voltage of the battery has not decreased below the predefined level after a predetermined interval of time from when the second circuit closed.

18. The system according to claim 1 wherein the first circuit includes part of a normally closed relay, and wherein the control system energizes a relay coil to open the first circuit when the system is armed and the engine is started and is running.

19. The system according to claim 1 wherein the first circuit includes part of a solid state switch.

20. The system according to claim 1 wherein the second circuit includes part of a solid state switch.

21. The system according to claim 1 wherein the second circuit includes part of a solenoid actuated switch.

22. The system according to claim 1 wherein the first circuit and the second circuit are connected to a single switch device.

23. In a vehicle having an engine, a battery producing a battery voltage, and an electrical system with an alternator which produces an alternator voltage, an improvement characterized by an anti-theft system for disabling the engine for theft deterrent purposes, said anti-theft system comprising:
a resistive element;
a first switch selectively connecting the battery to the electrical system;
a second switch selectively connecting the resistive element to the electrical system; and
a control system for controlling the operation of the anti-theft system, said control system detecting an unauthorized starting of the engine and responding by closing the second switch so as to cause the alternator voltage to electrically dissipate through the resistive element and stall the engine.

24. The system according to claim 23 wherein the control system including a sensor for determining whether the battery voltage is below a predetermined magnitude, said control system opening the second switch when the battery voltage has not decreased below the predetermined voltage a predetermined time after the second switch is closed.

25. The system according to claim 24 wherein the predetermined time is 25 ms.

26. The system according to claim 23 wherein the control system includes a detection system for detecting when the engine has been started.

27. The system according to claim 23 wherein the control system opens the first switch to disconnect the battery after the engine is running and closes the second switch after the first switch has opened.

28. The system according to claim 23 wherein the control system includes:
a mechanism to detect unauthorized starting of the engine and in response thereto producing an unauthorized vehicle start signal; and
a reset clock that is reset upon receiving the unauthorized vehicle start signal, said reset clock being reset at a low clock pulse, said control system causing the second switch to close on a high clock pulse.

29. The system according to claim 23 wherein the control system includes a logic system, said logic system testing whether the battery voltage is greater than a predetermined level and preventing the second switch to close if the battery voltage is greater than the predetermined level.

30. The system according to claim 23 wherein the control system includes
a battery voltage sensor that senses the battery voltage;
a battery temperature sensor that senses temperature of the battery; and
a low battery state of charge system connected to the battery voltage sensor and the battery temperature sensor, and having an algorithm that responds to the battery voltage sensor and the battery temperature sensor by an providing a signal that opens the first switch if a state of charge of the battery decreases below a predefined charge level.

31. The system according to claim 23 wherein the control system includes a driver entry system, said driver entry system being responsive to a vibration signal from a vibration sensor that indicates a person has entered the vehicle and is responsive to sensor signal from a battery voltage sensor indicating a decrease in the battery voltage, said driver entry system providing a signal that the anti-theft system is armed in response to either the vibration signal or the sensor signal.

32. A method for disabling a engine of a vehicle for theft deterrent purposes after the engine has been started, said method comprising the steps of:
providing a first switch electrically connected in series with a vehicle battery;
providing a resistive element electrically connected to an alternator of the vehicle;
providing a second switch electrically connected in series with the resistive element and electrically connected in parallel with the battery;
detecting whether the engine is running and whether the engine has been recently started; and
opening the first switch to electrically disconnect the vehicle battery and closing the second switch to electrically connect the alternator and the resistive element in series when the engine is started and is running.

33. The method according to claim 32 further comprising the step of detecting whether the engine is running and whether the engine has been recently started includes determining a vehicle battery voltage by determining whether the vehicle battery voltage is fluctuating, determining whether the vehicle battery voltage is above a predetermined value, and determining whether the vehicle battery voltage is below a predetermined value.

34. The method according to claim 32 further comprising the step of determining whether the voltage of the battery is below a predetermined battery voltage a predefined time after the second switch is closed, said control system opening the second switch if the battery voltage has not decreased below the predetermined voltage.

35. The method according to claim 33 wherein the step of detecting whether the engine is running and whether the engine has been recently started includes determining if the vehicle is vibrating.

36. The method according to claim 32 wherein the engine determined to be running and has been started in the presence of at least two of the vehicle is vibrating, the battery voltage is fluctuating and the vehicle battery voltage is greater than a first predetermined value, and also the vehicle battery voltage has fallen below a second predetermined value.

37. The method according to claim 32 further comprising the steps of determining whether a person has entered the vehicle and issuing an audible signal if the person has entered the vehicle while an anti-theft system is armed.

38. The method according to claim 32 further comprising the steps of determining whether a state of charge of the battery has reached a predefined level, and opening the first switch if the state of charge has reached the predefined level.

39. The method according to claim 32 further comprising the steps of providing a reset clock, resetting the reset clock upon detection of an unauthorized vehicle start, and closing the second switch after the reset clock goes to a positive pulse.

* * * * *